S. C. BOND.
MACHINE FOR ASSEMBLING BOTTLE CLOSURES.
APPLICATION FILED AUG. 12, 1913.
Reissued July 25, 1916.
14,170.
5 SHEETS—SHEET 1.
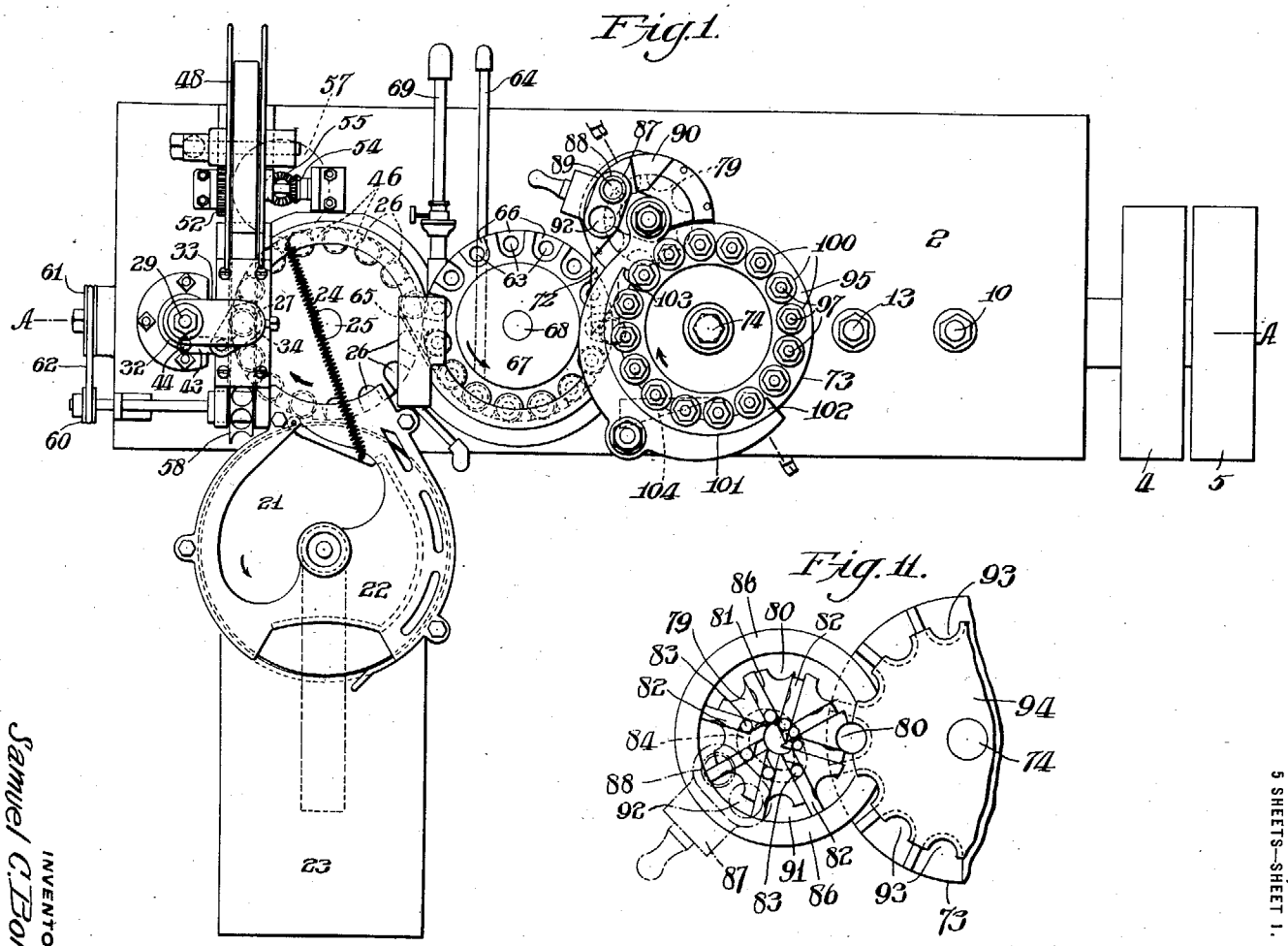
INVENTOR
Samuel C. Bond
WITNESSES
F. F. Gamble
BY Chas. A. Pattee
ATTORNEY S. C. BOND.
MACHINE FOR ASSEMBLING BOTTLE CLOSURES.
APPLICATION FILED AUG. 12, 1913.
Reissued July 25, 1916.
14,170.
5 SHEETS—SHEET 2.
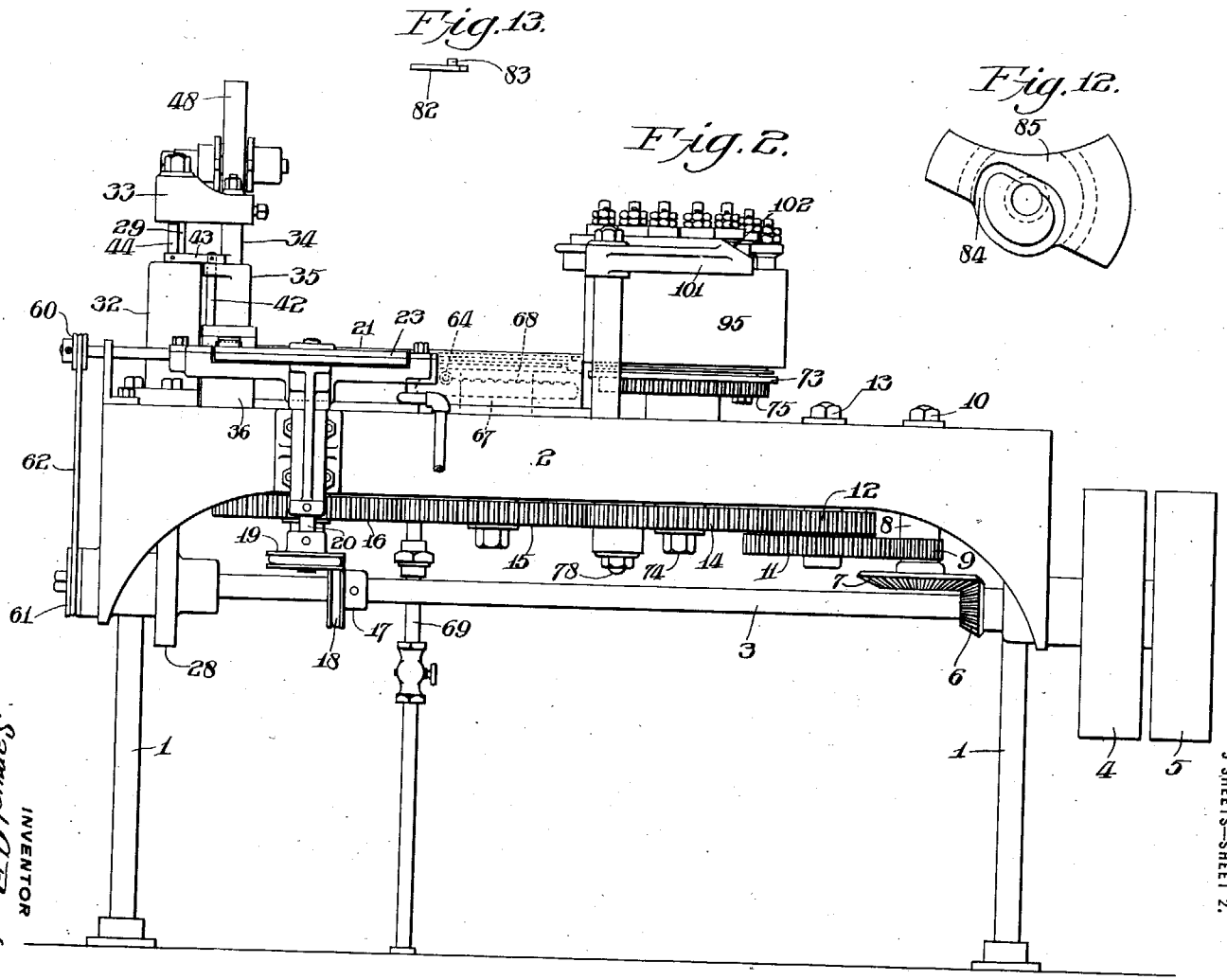
INVENTOR
Samuel C. Bond.
WITNESSES
F. F. Gamble
F. F. Gamble
BY Chas. A. Rutter
ATTORNEY S. C. BOND.
MACHINE FOR ASSEMBLING BOTTLE CLOSURES.
APPLICATION FILED AUG. 12, 1913.
Reissued July 25, 1916.
14,170.
5 SHEETS—SHEET 3.
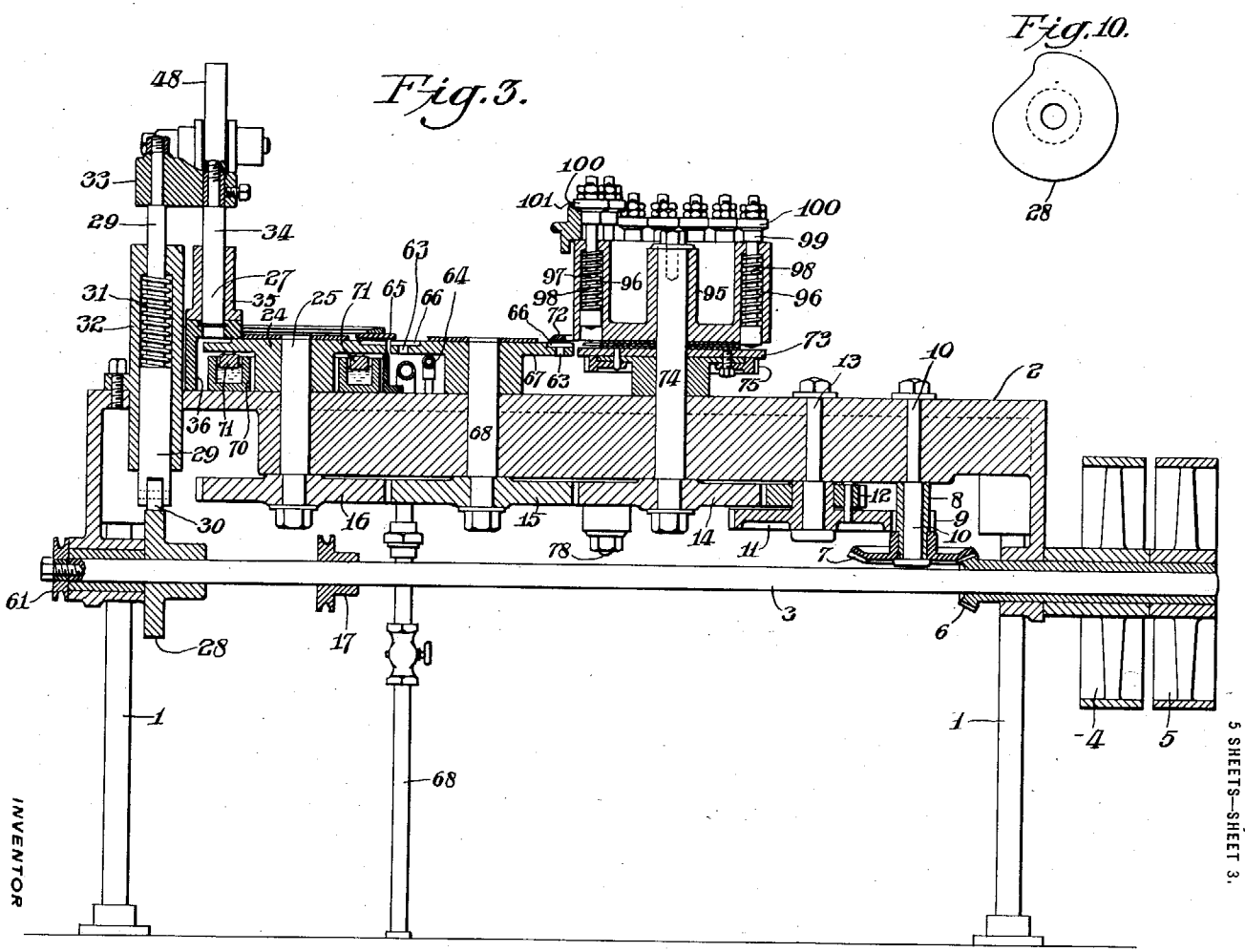
INVENTOR
Samuel C. Bond.
WITNESSES
F. F. Gamble
BY Chas. A. Pretter.
ATTORNEY S. C. BOND.
MACHINE FOR ASSEMBLING BOTTLE CLOSURES.
APPLICATION FILED AUG. 12, 1913.
Reissued July 25, 1916.
14,170.
5 SHEETS—SHEET 4.
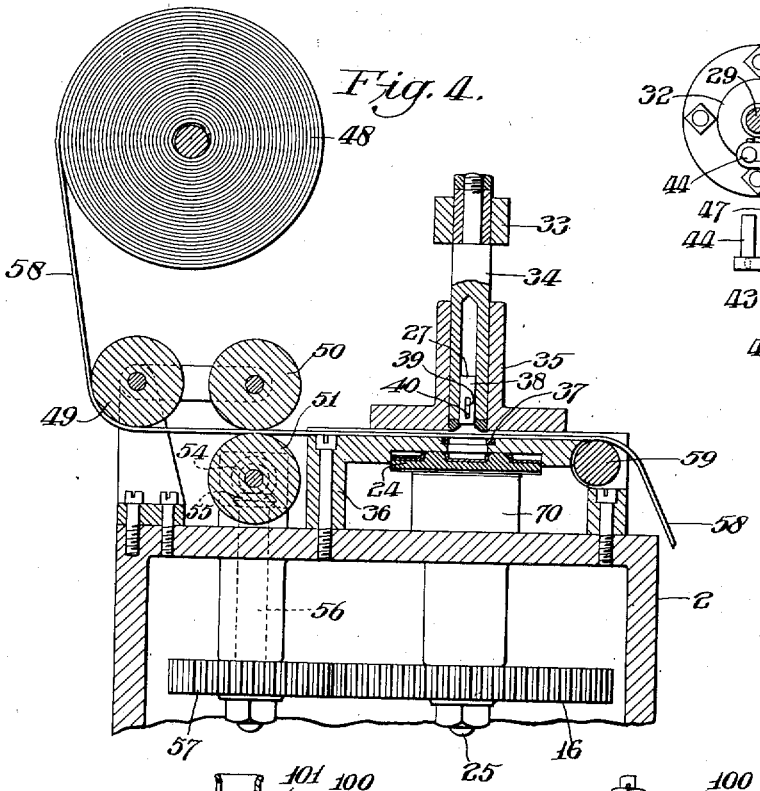
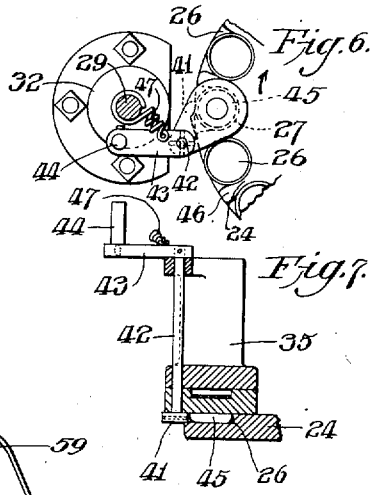
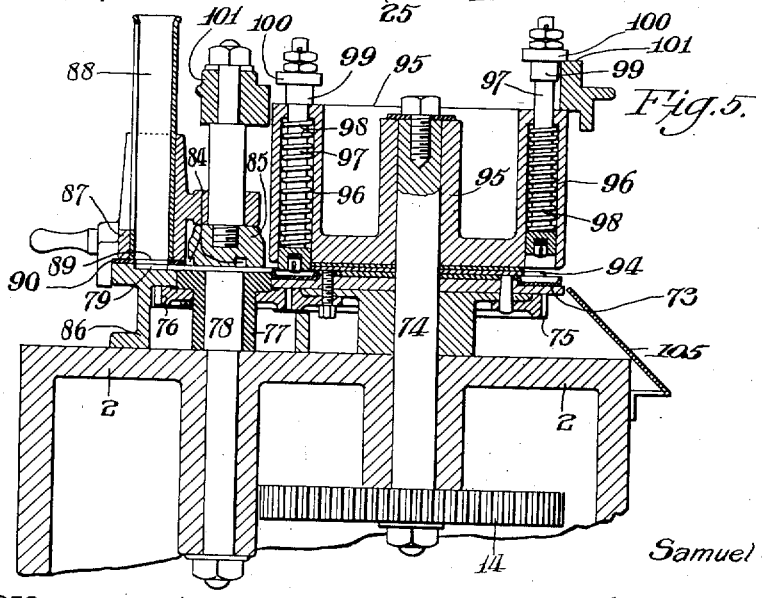
INVENTOR
Samuel C. Bond
WITNESSES
F. F. Gamble
F. F. Gamble
BY Chas A. Carter
ATTORNEY S. C. BOND.
MACHINE FOR ASSEMBLING BOTTLE CLOSURES.
APPLICATION FILED AUG. 12, 1913.
Reissued July 25, 1916.
14,170.
5 SHEETS—SHEET 5.
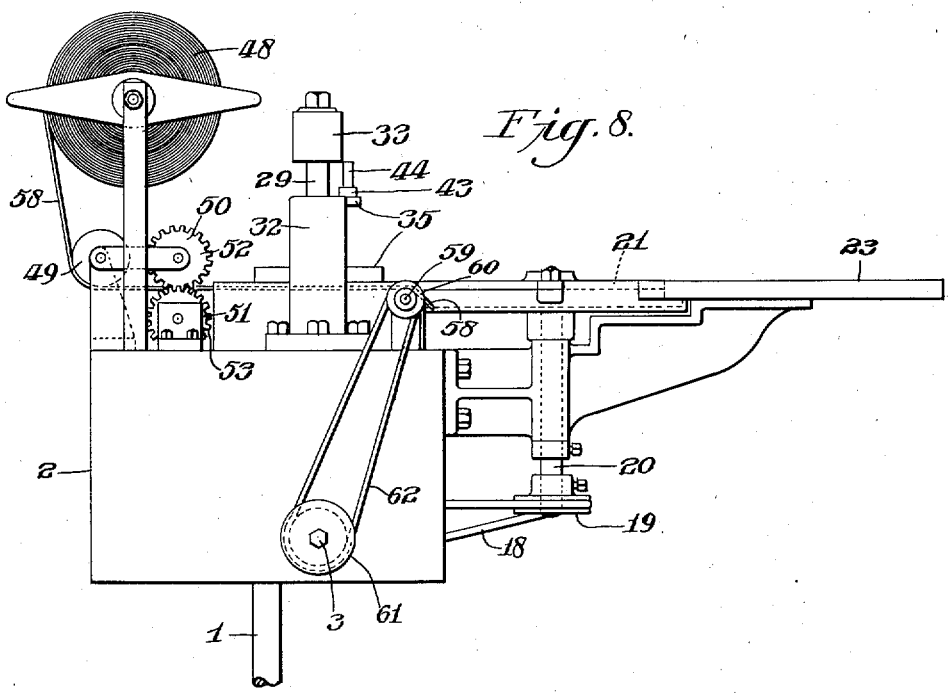
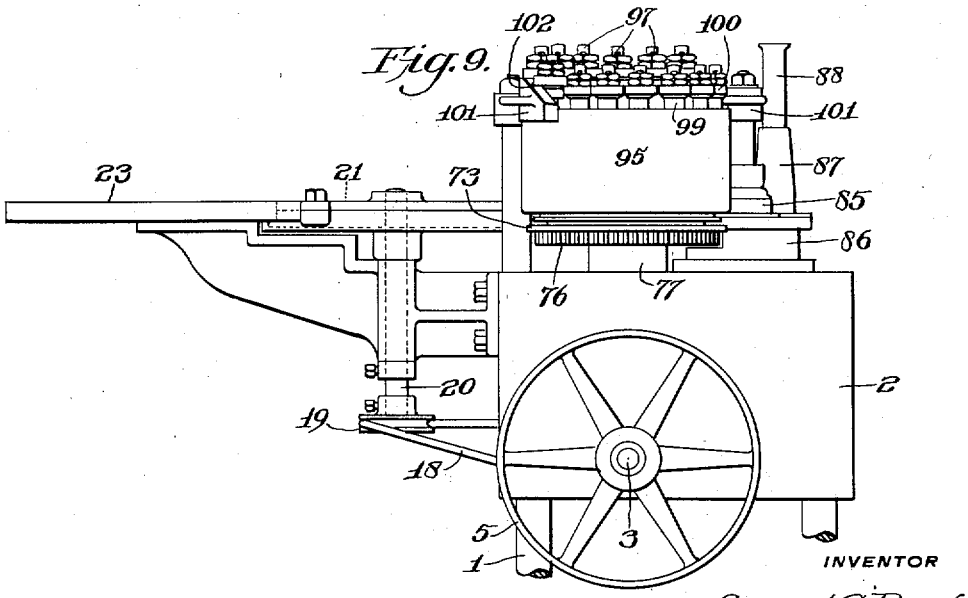
INVENTOR
Samuel C. Bond.
WITNESSES
H. H. Gamble.
F. F. Gamble
BY Chas. A. Cutler.
ATTORNEY

UNITED STATES PATENT OFFICE.

SAMUEL C. BOND, OF HOLLYOAK, DELAWARE, ASSIGNOR TO BOND BOTTLE SEALING COMPANY, OF WILMINGTON, DELAWARE, A CORPORATION OF DELAWARE.

MACHINE FOR ASSEMBLING BOTTLE-CLOSURES.

14,170. Specification of Reissued Letters Patent. Reissued July 25, 1916.

Original No. 1,063,324, dated June 3, 1913, Serial No. 683,258. Application for reissue filed August 12, 1913. Serial No. 784,451.

*To all whom it may concern:*

Be it known that I, SAMUEL C. BOND, a citizen of the United States, and a resident of Hollyoak, in the county of Newcastle and State of Delaware, have invented certain new and useful Improvements in Machines for Assembling Bottle-Closures or like Articles, of which the following is a specification.

My invention relates to improvements in machines for assembling the several parts of a bottle closure, or similar article, said parts consisting usually of a metallic cap, a sealing gasket or packing, and a cementing medium interposed between the cap and gasket, and the object of my invention is to furnish an improved machine for accomplishing this end in an expeditious, economical and satisfactory manner.

In the accompanying drawings forming part of this specification and in which similar letters of reference indicate similar parts throughout the several views:—Figure 1, is a plan of my improved closure assembling machine: Fig. 2, a front elevation of the machine; Fig. 3, a section of Fig. 1 on line A—A; Fig. 4, a vertical sectional elevation through the punch for cutting the fusible disks used to cement the gasket to the metal cap showing, in section, the rolls for guiding and for feeding the strip of material from which said disks are punched and the roll for carrying away said strip after being punched; Fig. 5, a section on line B—B, Fig. 1; Fig. 6, a plan of the device for rendering the punch inoperative when the cap carrier fails to carry a cap to a point beneath said punch; Fig. 7, a side elevation of part of Fig. 6; Fig. 8, an end elevation of the front end of the machine; Fig. 9, an end elevation of the rear end of the machine; Fig. 10, a plan of a cam for operating the punch for cutting fusible disks; Fig. 11, a plan of the gasket feeding disk and of part of the notched disk for holding the gasket; Fig. 12, a bottom view of the cam for actuating the fingers of the gasket carrying disk; Fig. 13, a side elevation of a finger carried by the gasket carrying disk.

My machine consists of a feeding device for carrying the metal caps of the closure to a constantly rotating wheel or table, of a means for placing a disk carrying, or consisting of, a fusible cementing medium in said caps while carried by said wheel or table without retarding its revolution, of a means for transferring said caps carrying the cementing medium from said first wheel to a second rotating wheel or table, in heating said caps while in said second wheel sufficiently to fuse the cementing material, in transferring said caps while still hot to a third rotating wheel or table, in placing in said caps, over the fused cementing material, while in said third wheel a gasket, in applying pressure to the tops of said gasket while being carried around in said third wheel and finally in removing said caps from said third wheel after the gaskets have been secured to said caps by the cementing material.

1 is the frame of my machine which has a flat top 2.

3 is the main driving shaft furnished with some means for driving, the usual fast and loose driving pulleys 4—5 for instance. Upon shaft 3 is a miter gear 6 which meshes with and drives a miter gear 7 which carries and drives a sleeve 8 which carries a spur gear 9. The gear 7 and sleeve 8 are carried by a stud 10 which is carried by the table top 2. The gear 9 meshes with and drives a gear wheel 11 the hub of which carries a gear wheel 12. 13 is a stud, carried by table top 2, upon which gear 11 is carried. Gear 12 meshes with and drives a gear 14 which meshes with and drives a gear 15 which meshes with and drives a gear 16. All of these gears being shown best in Figs. 2 and 3. The gears 14, 15 and 16 are all of the same diameter and all rotate at the same speed.

17 is a flanged pulley carried on shaft 3 which is connected by a belt 18 with a horizontally disposed pulley 19 which is attached to a suitably carried vertical shaft 20 the upper end of which carries a revolving feed disk 21 the top of which is covered, or partly covered, by a cover plate 22 in the usual manner. The feed disk 21 is driven at a high speed. The empty caps are placed upon a feeding table 23 and pass in between the cover plate 22 and the top of the revolving feed disk 21 and are carried to a rotating wheel or table 24 which is carried upon the upper end of shaft 25 which carries and is driven by the gear wheel 16 before referred to. The arrangement and operation of the feed disk 21, being well known, will not need detailed description. The caps being carried by the rapidly revolving disk 21 into the pockets 26 in the periphery of the more slowly moving wheel 24 are carried around in these pockets and presently pass under a punch 27, Figs. 1, 2, 3, 4, 6, 7, and 8, which cuts from a strip of fusible material a disk and places this disk in successive caps carried by the pockets of the wheel 24 as they are brought under the punch.

Upon the main shaft 3 is a cam 28, Figs. 2, 3 and 10, which lifts a vertical rod 29 upon each revolution of this shaft.

30 is a roller carried by lower end of rod 29 to reduce friction and wear.

31 is a spring bearing against a shoulder on rod 29 and in the guide 32 which holds the rod 29 in engagement with cam 28. At its upper end the rod 29 carries an arm 33 which carries the punch plunger 34 which operates vertically in a guide 35 which is carried by a frame 36 carried by the table top 2 as best shown in Fig. 4. The male part of the punch is carried or formed by the lower end of plunger 34, and the female part 37 by the frame 36. The male part of the punch being substantially of the same diameter as the interior of the metal cap, and these caps being carried around under the punch by the constantly moving wheel 24, it would be practically impossible to employ the punch itself to carry the punched disk to the interior of the cap as the latter would certainly engage the side of the former before it could be withdrawn. In order that the punched disk may be placed in the cap without danger of improper contact of any of the parts of the machine, I bore out the lower part of punch plunger 34 and place loosely therein a feeding rod 38 which is slotted at 39 for a pin 40 which limits its vertical movement. The rod 38 is supported by the strip of fusible material before it is punched but as soon as the punch cuts a disk, the rod 38, resting on this unsupported disk, drops and by its weight carries the disk to the cap. The disk having been placed in the cap, the cam 28 lifts the rod 29 and connected parts until the lower end of rod 38 is above the level of the strip of fusible material when the mechanism feeding this to the punch presently carries it under the punch when this latter is again operated. At this time the wheel 24 has carried another cap under the punch and the operation above described is repeated.

It may sometimes happen that one of the pockets of the wheel 24 will pass the feeding plate without receiving a cap and in this event it is important that the punch 27 fail to operate, for if it did the fusible disk would drop into the pocket and would probably adhere to the outer side of a cap subsequently carried by this pocket and would cause trouble when the cap was heated. In order to prevent the operation of the punch and the cutting of a fusible disk for an unoccupied pocket of the wheel 24, I employ a finger 41, Figs. 6 and 7, which is secured to the lower end of a vertical shaft 42 carried in suitable bearings forming part of the guide 35 of the punch plunger 34. The upper end of shaft 42 carries fixedly an arm 43 which carries an upright stop 44. The outer end of finger 41 is engaged by the sides of the caps 45 carried in pockets in wheel 24 or by the partitions 46 between these pockets. If it should happen that a pocket does not carry a cap the outer end of finger 41, when it reaches this capless pocket, will be unsupported and a spring 47 will pull the outer end of arm 43 in between the top of the guide 32 and the arm 33, carried by the top of cam rod 29, and will prevent the falling of arm 33 and the operation of the punch to cut a disk for the particular pocket of the wheel unoccupied by a cap. As the wheel revolves the end of finger 41 is presently engaged and moved out by the partition at the rear side of the unoccupied pocket and moves the stop 44 out from under arm 33 when the mechanism actuating the punch again is free to operate.

I prefer to form the disk of fusible material, which is to cement the cap and gasket together, from a narrow strip of the material. I carry this strip upon a roll 48, Figs. 1, 4 and 8. From roll 48 the strip passes down under a guide roll 49, thence between drawing rolls 50—51, under the punch, and over a driven roll. The drawing rolls are connected by gears 52—53 and the shaft of one of these rolls carries a bevel gear 54 which is driven by a bevel gear 55 which is carried on a shaft 56 which carries a spur gear 57 which meshes with and is driven by the spur gear 16 which drives the wheel 24. The feeding of the strip 58 of fusible material from which the disks are cut is constant and when the punch is in contact with this strip it is moving forward and buckles up between the feed rollers 50—51 and the punch but there being some considerable stiffness to this strip it straightens out as soon as released by the punch being lifted and no harm results. After leaving the punch the then perforated strip passes over a roller 59, which I prefer should be positively driven at a considerable speed, to assist the passage of the perforated strip away from the punch. To drive roller 59 I place upon its shaft a pulley 60 and connect this pulley to a pulley 61, carried by the main shaft 3, by a belt 62. The caps having the fusible disks placed in them are carried around by the wheel 24 until presently, one at a time, their edges projecting up above the top of the wheel, are engaged by a shifter 65, which is simply a flat piece of metal which is placed tangentially to the inner side of the pockets 26 as shown in Fig. 1. The rotation of wheel 24 moves the caps along the shifter 65 until they enter pockets 66 formed in periphery of wheel 67 which is carried on and driven by shaft 68 of gear wheel 15 at the same speed as wheel 24. Beneath the wheel 67 is a heating device to fuse the disks in the metal caps; the heat being preferably applied to the under side of the wheel, and in order that the heat may reach the caps the bottom of pockets 66 are perforated as shown at 63, Fig. 1. I prefer to use gas as the heating agent which is conducted to any suitable form of burner by a pipe 69.

64 is a pipe for a pilot light which burns when the main burner is turned out. As this construction is old it will not need elaboration.

Heat from the wheel 67, or the burners for heating this wheel, is very apt to be carried to the wheel 24, where it is not wanted, and perhaps to the punch, where, owing to the nature of the fusible material, it would be fatal, and in order that this wheel and punch may be kept cool I place under the wheel a tank 70 which is kept supplied with cool water and I furnish the under side of the wheel 24 with a flange 71 which enters the water in tank 70. This arrangement I find sufficient to prevent danger of heating parts which should be kept cool. The caps having been heated and the disks fused while in wheel 67 are, when this wheel in its revolution brings them to a shifter 72, similar in arrangement and operation to shifter 65, switched from pockets in wheel 67 to pockets in a wheel 73 where they receive the gaskets and where pressure is applied to the top of the gaskets until their adhering to the caps is assured. The wheel 73 is carried upon the shaft 74—which carries the gear 14 and is driven by the rotation of this gear at the same speed as the wheels 24 and 67. Beneath the wheel 73 and fast to and driven by shaft 74, which carries and drives this wheel, is a gear 75 which meshes with and drives a gear wheel 76, Fig. 5, which is fast to a sleeve 77 which rotates around a spindle 78 projecting up vertically from table top 2. Fast to top of sleeve 77 is a plate 79 the periphery of which is furnished with pockets 80 and with radial slots 81 for carrying fingers 82 which are furnished with upwardly projecting pins 83 which rest in a cam groove 84 formed in a stationary casting 85 which is carried by the frame 86, carried by plate 2, see Figs. 5, 11 and 12. As the plate 79 revolves it causes the pins 83 on the fingers 82 to travel around in the cam groove 84 and the fingers are thereby moved in and out in slots 81 in plate 79. Pivoted to the center of the casting 85 is an arm 87, Figs. 1, 5 and 11 which carries a tube 88 which carries a stack of gaskets, in most cases thin circular disks of cork. In its operative position the tube 88 registers with a perforation 89 in a plate 90 which covers the outer part of the plate 79 and with the pockets in the periphery of plate 79 when these pockets are by the revolution of the plate brought successively beneath it. The plate 79 is carried in a depression formed in the top of frame 86, this depression being of somewhat greater diameter than the plate and forming a runway 91 for the disks or gaskets as they are carried from the tube 88 to the caps. The arm 87 may be moved around its center and over the plate so as to move the tube 88 out of register with the perforation 89 in plate 90 when it is desired to cut off the feeding of the gasket to the plate 79. The arm 87 is furnished with a perforation 92 which may be brought in register with perforation 89 when it is desired to have access to this latter perforation for any purpose. In Fig. 11 a plan of the plate 79 is shown and from this figure the positions of the several fingers 82 in relation to the runway 91 will be seen. These fingers not only push the gasket along the runway but also sweep this runway clean during their passage of any particles of cork or other material which might presently interfere with the proper working of this part of the machine. The plate 79 and the fingers 82 carry the gaskets around until the pockets 80 in this plate are directly opposite pockets 93 which are carried in a circular plate 94 which substantially engages plate 79 and which is carried by and turns with the shaft 74 which is driven by gear 14 which drives the wheel 73 which carries the caps to receive the gaskets. The pockets 93, in plate 94, which are semi-circular, are placed directly over the pockets in wheel 73 and when the pockets in plates 79 and 94 are in register the gasket is held between them being half grasped by each one. The plates 79 and 94 are at a somewhat higher level than the tops of the caps carried in wheel 73 and when the pockets in plates 79 and 94 are in register the gasket is engaged by a plunger and driven out from between these plates to a cap as follows.

Carried by the shaft 74 is a head 95, best shown in Fig. 5, which is furnished with as many vertical guides 96 as there are pockets in the wheel 73, each pocket having a guide directly over it. Each pocket carries a plunger 97 and a spring 98 for forcing said plunger downward. In its lowest position the lower end of a plunger bears against the top of a gasket and holds it against the disk of fused material carried in a cap, but should there be no gasket in the cap, the lower end of the plunger will not fall sufficiently far to touch the fused material, if it did this sticky material adhering to it would cause no end of trouble until removed. The fall of the plungers is regulated by a hardened steel collar 99 interposed between the tops of the guides 96 and a collar 100 carried on the upper end of the plungers.

101 is a stationary semi-circular cam at the top of head 95 the front end of which is beveled, as at 102 and the rear end of which is abrupt, as at 103. As the casting 95 is revolved the collars 100 on the plungers 97 are brought successively to the beveled front end 102 of cam 101, ride up this bevel, which lifts the plungers from the gasket in the cap, and travel along the flat top of the cam until they reach the abrupt end 103 when they are dropped. At the point where the plungers are dropped they are directly over the gasket carried by the plates 79 and 94 and the falling plunger drives them out from between these plates and seats them upon the fused cementing disk carried by the hot caps carried in the pockets in wheel 73. The plungers having driven the gaskets to the caps remain in contact with and press them down, until the revolution of the machine brings the collars 100 to the beveled front end of cam ring 101 which lifts the plungers as before described and holds them above the caps so long as the collars 100 are in contact with ring-cam 101. During this time the caps are removed from wheel 73. The plungers are held in pressing contact with the gaskets a sufficient time to insure the cementing medium setting sufficiently to secure the gaskets to the caps. After the plungers are lifted by the cam ring 101 out of contact with the assembled closures the latter are engaged by a shifter 104, precisely similar in construction and operation to the shifters 65 and 72, previously described, which removes them from the pockets in wheel 73 and guides them to an inclined guide 105, Fig. 5, which directs them to some sort of a receptacle which is not shown.

Having thus described my invention I claim as new and desire to secure by Letters Patent:

1. In a machine of the character described, in combination, a means for bringing into register at an assembling point the metal cap, a sealing gasket and a cementing medium interposed between said cap and gasket, means operative at said assembling point for inserting the gasket into and for pressing it against said cap, and means for moving the assembled closure while under pressure from said inserting means away from said assembling point.

2. In a machine of the character described, in combination, a rotating support carrying caps, means for bringing sealing gaskets into register with successive caps carried by said support, a series of plungers serving the double purpose of inserting gaskets into said caps and of maintaining a pressure upon said gaskets until a cementing medium interposed between them and said caps is set, means for depressing and holding said plungers under pressure, and means for elevating said plungers after their work has been performed.

3. In a machine of the character set forth, in combination, a rotating support carrying caps containing a cementing medium, means for registering a sealing gasket with each cap as they are successively brought to one point, a series of circularly disposed plungers adapted to be successively brought into register with gaskets carried by said gasket registering means, a means for carrying said plungers, means for rotatively carrying said plunger carrying means, means for depressing and for holding some of said plungers under pressure in contact with gaskets in said caps, and means for elevating said plungers after their work has been performed.

4. In a machine for assembling a bottle closure which comprises a cap, a gasket, and a fusible cementing material between said cap and gasket, in combination a means for cutting and a means for placing in the cap a disk of fusible cementing material while the cap is being continuously moved in a carrier, a second continuously moving carrier into which the cap carrying the fusible material is transferred from the first carrier, means for effecting said transfer, means for heating said cap and fusing the cementing material therein while in said second carrier, a third continuously moving carrier to which said heated cap is transferred from said second carrier, means for effecting said transfer, a means for carrying a gasket to said cap while in said third carrier, and a plunger for pressing and holding said gasket in said cap until said cementing material is set.

5. In a machine for assembling a bottle closure, comprising a cap, a gasket, and fusible cementing material interposed between said cap and gasket, in combination, a continuously rotating pocketed wheel for carrying a cap containing the cementing material, a peripherally notched disk above and rotating with said cap carrying wheel, the notches in said disk registering with the pockets in said wheel, a peripherally notched and radially slotted gasket feeding disk, a race in which said gasket feeding disk turns, longitudinally movable fingers carried by the slots in said gasket feeding disk, a cam for directing the movements of said fingers, plungers rotating with said cap carrying wheel adapted to drive a gasket out between the notches in said notched disks to a cap and to press upon said gasket until the cementing material is set, and a means for carrying and a means for operating said plungers.

6. In a mechanism for assembling and pressing together the several members of a bottle or like closure, in combination, a traveling head, a multiplicity of plungers, carried by said head, a cap carrier traveling with said head, means for elevating and depressing said plungers, and a means operating in connection with said head for limiting the downward movement of said plungers.

7. In a mechanism for assembling and pressing together the several members of a bottle or like closure, in combination, a rotating head, a multiplicity of plungers concentrically carried by said head, a cap carrier traveling with said head means for elevating and depressing said plungers, and a means operating in connection with said head for limiting the downward movement of said plungers.

8. In a mechanism for assembling and pressing together the several members of a bottle or like closure, in combination, a rotating head, a multiplicity of plungers concentrically carried by said head, a cap carrier traveling with said head, springs for depressing said plungers, a cam-ring for lifting, holding and releasing said plungers, and a means operating in connection with said head for limiting the fall of said plungers.

9. In combination, a continuously rotating cap carrying wheel, means for feeding to said wheel the metal cap of a bottle closure containing a cementing material, a means for bringing a gasket over and into register with said cap, a plunger, rotating with said cap carrying wheel, for driving said gasket into said cap and for holding it under pressure until the cementing material is set, means for lifting and means for depressing said plunger, and a means carried by said plunger and operating in connection with said head for limiting its downward movement.

10. In combination, a continuously rotating cap carrying wheel, a head rotating with said wheel, movable plungers carrying collars carried concentrically by said head, springs for depressing said plungers, a cam-ring for engaging said collars and lifting said plungers, and a stop for preventing said plungers from engaging said cap carrying wheel.

11. In a machine of the character described, in combination, a constantly rotating cap carrying wheel and a means for punching a disk from a strip of fusible material and for simultaneously placing said disk in a cap carried by said wheel.

12. In a machine of the character described, in combination, a punch, a constantly moving cap carrying means adapted to bring successive caps of substantially the same diameter as said punch into register with it, and a means, operating in connection with said punch, for carrying a disk cut by said punch into a cap carried by said carrying means.

13. In a machine of the character set forth, in combination, a punch, a cam actuated means for lifting and a spring for depressing said punch, a cap carrying means for bringing caps successively into register with said punch, a gag for rendering said punch inoperative, and means operated by contact with a cap while in said cap carrying means for holding said gag in an inoperative position.

14. In a machine of the character set forth, in combination, a reciprocating punch, a cam actuated means for elevating and a spring for depressing said punch, a cap carrying means for bringing caps successively into register with said punch, and a means actuated by engagement with a cap while in said cap carrying means for permitting said spring to operatively actuate said punch.

15. In a machine of the character set forth, in combination, a punch, an arm, a rod secured to said arm, means for lifting and a spring for lowering said rod and punch, a cap carrying means for bringing caps successively into register with said punch, a gag for arresting the downward movement of said punch, and means operated by a cap carried by said cap carrying means for keeping said gag in an inoperative position.

16. In a machine of the character set forth, in combination, a punch, means for reciprocating said punch, a cap carrying means for bringing caps successively into register with said punch, a stop or gag, an arm carrying said stop or gag, a shaft carrying said arm, bearings for said shaft, a finger carried by said shaft adapted to be engaged by a cap carried by said cap carrying means to keep said stop or gag in an inoperative position, and a spring adapted to move said stop or gag into position to arrest the operative movement of said punch when said finger is out of engagement with a cap.

17. In a machine of the character set forth, in combination, means for inserting a cementing material in a cap, means for heating and fusing said material while in said cap, means for registering a sealing gasket with said cap, means for forcing said gasket into contact with said fused cementing material, means for maintaining said contact until said cementing material is set, and continuously moving carrying means for bringing the cap in succession to all of said means.

18. In a cap assembling machine, a movable support, means for heating and feeding heated tins periodically to said support, means for supporting sealing disks above the heated tins on said support, means for feeding sealing disks to the said disk-supporting means in position above the heated tins on said support, means movable with said support for driving the disks thus supported into said tins and means for retracting said driving means.

19. In a cap assembling machine, a rotatable turret having a table for supporting tins and means for supporting corks, a series of vertically movable plungers above said table, means for heating and feeding heated tins to said table beneath said plungers, means for feeding corks into position above the heated tins on the table and means for operating said plungers to drive the corks thus supported into said tins.

20. In a cap assembling machine, means for heating and feeding tins, means for supporting corks above but out of contact with the heated tins, spring pressed plungers above the cork supporting means and disposed in line with the corks supported thereby and means for retracting and releasing the spring pressed plungers whereby to cause said plungers to drive the supported corks into the heated tins.

21. In a cap assembling machine, the combination with means for feeding the tins, of means for heating the tins advanced by said feeding means, an assembling device independent of the heating means and arranged to receive the heated tins after the heating thereof has been discontinued and means for positioning the corks above the tins taken by the assembling device, said assembling device having means for forcing the corks into the tins and holding the corks therein under pressure.

22. In a cap assembling machine, the combination of means for feeding the tins, means for heating the tins advanced by said feeding means, an assembling device including a table separate and independent from the heating means arranged to receive and support the tins after the heating thereof has been discontinued and plungers disposed above the table, means for positioning the corks above the tins supported on the table, and means operating the plungers to drive said corks into the tins and hold them under pressure therein.

23. In a cap assembling machine, means for heating the tins, an assembling device separate from said heating means, including a supporting table and punches supported above the same, means for feeding the tins after being heated onto the assembling table, means for feeding corks to the tins and means operating the punches to unite the corks with the tins.

24. In a cap assembling machine, a movable assembling table, means for feeding the tins onto said table, movable means for supporting corks above such tins, assembling punches above and movable with the table and means operating said punches to drive the corks thus supported into the tins and hold them under pressure until united with such tins.

SAMUEL C. BOND.

Witnesses:
HENRY P. SCOTT, JR.,
WALTER H. MATSON.